United States Patent [19]

Mueller et al.

[11] Patent Number: 5,318,956

[45] Date of Patent: * Jun. 7, 1994

[54] USE OF SELECTED ESTER OILS IN WATER-BASED DRILLING FLUIDS OF THE O/W EMULSION TYPE AND CORRESPONDING DRILLING FLUIDS WITH IMPROVED ECOLOGICAL ACCEPTABILITY

[75] Inventors: Heinz Mueller, Monheim; Claus-Peter Herold, Mettmann; Stephan von Tapavicza, Erkrath; Johann Friedrich Fues, Grevenbroich, all of Fed. Rep. of Germany

[73] Assignee: Henkel Kommanditgesellschaft auf Aktien, Fed. Rep. of Germany

[*] Notice: The portion of the term of this patent subsequent to Mar. 16, 2010 has been disclaimed.

[21] Appl. No.: 55,409

[22] Filed: Apr. 29, 1993

Related U.S. Application Data

[63] Continuation of Ser. No. 776,003, Nov. 15, 1991, abandoned.

[30] Foreign Application Priority Data

May 16, 1989 [DE] Fed. Rep. of Germany ....... 3915876

[51] Int. Cl.$^5$ : ............................................. C09K 7/06
[52] U.S. Cl. .................................................. 507/139
[58] Field of Search ......................................... 507/139

[56] References Cited

U.S. PATENT DOCUMENTS

| | | | |
|---|---|---|---|
| 1,999,147 | 4/1935 | Ambrose et al. | 252/8.5 |
| 2,632,347 | 3/1953 | Sproule et al. | 80/60 |
| 2,661,334 | 12/1953 | Lummus | 252/8.5 |
| 3,062,740 | 11/1962 | Reddie et al. | 252/8.5 |
| 3,244,638 | 4/1966 | Foley et al. | 252/8.5 |
| 3,761,410 | 9/1973 | Mondshine et al. | 252/8.5 |
| 4,409,108 | 10/1983 | Carney et al. | 507/138 |
| 4,631,136 | 12/1986 | Jones, III | 507/138 |
| 4,839,096 | 6/1989 | Dennis et al. | 507/136 |

*Primary Examiner*—Gary Geist
*Attorney, Agent, or Firm*—Ernest G. Szoke; Wayne C. Jaeschke; Real J. Grandmaison

[57] ABSTRACT

The use is disclosed of water-dispersible esters, which are fluid or at least plastically deformable at working temperature and have flash points of at least 80° C., from saturated and/or unsaturated carboxylic acids with up to 36 carbon atoms and mono- and/or polyhydric alcohols, as at least the main constituent of the dispersed oil phase of water-based O/W-emulsion drilling fluids which are suitable for the environmentally friendly development of geological formations and which contain, if desired, insoluble, finely particulate weighting agents for the formation of water-based O/W-emulsion drilling muds and/or further additives, such as emulsifiers, fluid-loss additives, wetting agents, alkali reserves and/or auxiliary substances for the inhibition of drilled rock of high water-sensitivity.

24 Claims, No Drawings

USE OF SELECTED ESTER OILS IN WATER-BASED DRILLING FLUIDS OF THE O/W EMULSION TYPE AND CORRESPONDING DRILLING FLUIDS WITH IMPROVED ECOLOGICAL ACCEPTABILITY

This application is a continuation of application Ser. No. 07/776,003 filed on Nov. 15, 1991 now abandoned.

BACKGROUND OF THE INVENTION

1. Field of the Invention

The invention discloses new drilling fluids based on water-based O/W-emulsions and O/W-emulsion drilling muds based thereon, which are distinguished by high ecological acceptability and at the same time good standing and application properties. An important area of use for the new drilling mud systems is in off-shore wells for the development of petroleum and/or natural gas deposits, the aim of the invention being particularly to make available drilling fluids with high ecological acceptability which can be used in industry. The use of the new drilling mud systems admittedly has particular significance in the marine environment, but is not limited thereto. The new mud systems can also be put to quite general use in land-based drilling, i.e. also for the development of petroleum and/or natural gas deposits here. They are, however, new valuable working agents, for example, also in geothermal wells, in water boreholes, in the drilling of geoscientific bores and in drilling for the mining industry. It is also essentially true here that the associated ecotoxic problems are substantially simplified by the new water-based O/W-drilling fluids selected according to the invention.

2. Discussion of Related Art

Liquid mud systems used in the sinking of rock bores for bringing up the loosened drill cuttings are known to be flowable systems, thickened to a limited extent, which can be assigned to one of the three following classes:

Purely aqueous drilling fluids; drilling mud systems based on oil, which as a rule are used in the form of so-called invert emulsion muds, and represent preparations of the W/O-emulsion type in which the aqueous phase is distributed as a heterogeneous fine dispersion in the continuous oil phase. The third class of the known drilling fluids is composed of water-based O/W-emulsions, i.e. fluid systems which contain a heterogeneous, finely-dispersed oil phase in a continuous aqueous phase. The invention discloses improved systems of this latter type. The application properties of the drilling fluids of such O/W-emulsion systems take an intermediate position between the purely aqueous systems and the oil-based invert fluids. The advantages, but also the disadvantages, of the purely aqueous systems are connected with the advantages and disadvantages of the oil-based invert-emulsions disclosed hitherto. Detailed information on this subject can be found in the relevant specialist literature, refer, for example, to the text book by George R. Gray and H. C. H. Darley, "Composition and Properties of Oil Well Drilling Fluids", 4th. edition, 1980/1981, Gulf Publishing Company, Houston, and the extensive specialist and patent literature cited therein and to the manual "Applied Drilling Engineering", Adam T. Bourgoyne, Jr. et al., First Printing Society of Petroleum Engineers, Richardson, Tex. (USA).

One of the main weaknesses of purely water-based drilling mud systems lies in the interaction of water-sensitive, particularly water-swellable, rock and/or salt formations with the aqueous drilling fluid and the secondary effects initiated thereby, in particular bore-hole instability and thickening of the drilling fluid. Many proposals are concerned with the reduction of this problem area and have, for example, resulted in the development of the so-called inhibitive water-based muds, cf. for example, "Applied Drilling Engineering", loc. cit., Chapter 2, Drilling Fluids, 2.4 and Gray and Darley loc. cit., Chapter 2, in particular the sub-section on pages 50 to 62 (Muds for "Heaving Shale", Muds for Deep Holes, Non-Dispersed Polymer Muds, Inhibited Muds: Potassium Compounds).

In more recent practice, in particular drilling fluids based on oil, which consist of the 3-phase system oil, water and finely particulate solids and are preparations of the W/O-emulsion type, have succeeded in overcoming the difficulties described above. Oil-based drilling fluids were originally based on diesel oil fractions containing aromatics. For detoxification and to reduce the ecological problems created thereby, it was then proposed to use hydrocarbon fractions which are largely free of aromatics—now also known as "non-polluting oils"—as the continuous oil phase, see in this regard, for example, the publications by E. A. Boyd et al. "New Base Oil Used in Low Toxicity Oil Muds", Journal of Petroleum Technology, 1985, 137–143 and R. B. Bennet "New Drilling Fluid Technology—Mineral Oil Mud", Journal of Petroleum Technology, 1984, 975–981 and the literature cited therein.

Drilling fluids of the water-based O/W-emulsion system type have also hitherto used pure hydrocarbon oils as the dispersed oil phase, cf. here, for example, Gray, Darley loc. cit., p. 51/52 under the section "Oil Emulsion Muds" and the tabular summary on p. 25 (Tables 1–3) with details of water-based emulsion fluids of the salt-water mud, lime mud, gyp mud and CL-CLS mud type.

In this context in particular it is known that water-based O/W-emulsion fluids represent a substantial improvement in many regards to the purely water-based drilling mud systems. Particularly in more recent times, however, the advantages and disadvantages of such water-based emulsion fluids have also been examined critically in comparison with the oil-based invert-systems. This is due to the considerable ecological reservations felt towards the oil-based invert drilling fluids commonly used today.

These ecological reservations can be subdivided into two problem areas:

In addition to the basic constituents, i.e. oil and water, all drilling fluid systems based on water and/or oil require a large number of additives for the establishment of the desired application properties. The following can be mentioned here purely by way of example: emulsifiers or emulsifier systems, weighting agents, fluid-loss additives, wetting agents, alkali reserves, viscosity regulators, in some cases auxiliary agents for the inhibition of drilled rock with high water-sensitivity, disinfectants and the like. A detailed summary can be found, for example, in Gray and Darley, loc. cit., Chapter 11, "Drilling Fluid Components". The industry has developed additives which currently appear ecologically harmless, but also additives which are ecologically questionable or even ecologically undesirable.

The second problem area is caused by the oil phases used in such drilling fluids. Even the hydrocarbon fractions which are largely free from aromatics, currently known as "non-polluting oils", are not completely harmless when released into the environment. A further reduction in the environmental problems, which are caused by the fluid oil phases of the type referred to here, appears urgently necessary. This is true in particular for the sinking of off-shore wells, e.g., for the development of petroleum or natural gas deposits, because the marine eco-system reacts particularly sensitively to the introduction of toxic and poorly degradable substances.

There have recently been some proposals for reducing these latter problems. For example, the U.S. Pat. Nos. 4,374,737 and 4,481,121 disclose oil-based invert-drilling fluids in which non-polluting oils are to be used. The following can be mentioned together as of equal value as non-polluting oils: mineral oil fractions which are free from aromatics and vegetable oils, such as peanut oil, soybean oil, linseed oil, corn oil, rice oil or even oils of animal origin, such as whale oil. These named ester oils of vegetable and animal origin are all, without exception, triglycerides of natural fatty acids, which are known to have high environmental acceptability and are clearly superior from the ecological point of view to hydrocarbon fractions—even when these do not contain aromatic hydrocarbons.

In the above U.S. Patent Specifications, however, not one concrete example describes the use of such natural ester oils in invert drilling fluids. Without exception, mineral oil fractions are used as the continuous oil-phase. In fact, oils of vegetable and/or animal origin of the type mentioned here are not considered for invert drilling fluids for practical reasons. The rheological properties of such oil phases cannot be controlled over the wide temperature range generally required in practice, from 0° to 5° C. on the one hand, up to 250° C. and more on the other.

THE APPLICANT'S EARLIER PROPOSALS

A series of earlier Applications by the Applicant describes the use of easily biodegradable and ecologically harmless ester oils as the continuous oil phase in W/O-invert drilling mud systems. Refer here in particular to the earlier Applications P 38 42 659.5 and P 38 42 703.6 U.S. Ser. No. 07/452,457 filed Dec. 18, 1989 and U.S. Ser. No. 07/452,988 filed Dec. 19, 1989 both abandoned and the modifications of the ester oils that can be used according to the details of the earlier Patent Applications P 39 07 391.2 and P 39 07 392.0 (D 8606 and D 8607).

The subject of these earlier Applications is the use of ester oils based on selected monocarboxylic acids and monocarboxylic acid mixtures and monofunctional and optionally polyfunctional alcohols as the continuous oil phase in W/O-invert systems. The earlier Applications show that, using the esters and ester mixtures disclosed therein, not only can satisfactory rheological properties be established in the fresh drilling fluid, but it is also possible by the additional use of selected, known alkali reserves in the drilling fluid, for work to be carried out without fearing undesired thickening effects when there is a partial ester hydrolysis.

An important further development of such invert drilling fluids based on ester oils is the subject of the Applicant's earlier Application P 39 03 785.1 U.S. Ser. No. 07/478,185 filed Feb. 9, 1990 now abandoned.

The teaching of this earlier Application starts with the concept of also using a further additive in invert drilling fluids based on ester oils which is suitable for keeping the desired rheological data of the drilling fluid in the required range, even when in practice larger and larger amounts of free carboxylic acids are formed by partial ester hydrolysis. The Application provides for the additional use of basic amine compounds, which are capable of forming salts with carboxylic acids and have a marked oleophilic nature and at most limited water-solubility, as additives in the oil phase.

DESCRIPTION OF THE INVENTION

Other than in the operating examples, or where otherwise indicated, all numbers expressing quantities of ingredients or reaction conditions used herein are to be understood as modified in all instances by the term "about".

THE INVENTION PROBLEM AND ITS TECHNICAL SOLUTION

The present invention starts with the problem of providing drilling mud systems of the highest, and in this form previously unknown, ecological acceptability which simultaneously have good application properties and which also in particular enable satisfactory application in problem areas. In the invention a conscious decision has therefore been made to reject the oil-based type of invert drilling mud systems and to return to the oil-modified water-based type of O/W-emulsion systems. The auxiliary agents described in the cited earlier Applications of the Applicant, and the ecological advantages associated therewith, are now, however, also to be used in this class of drilling mud systems.

In a first embodiment, the aim of the invention is therefore to make use of the advantages that O/W-emulsion mud systems have against purely water-based drilling fluids, but at the same time to replace the mineral-oil phase at least to a substantial amount—preferably completely—with ecologically harmless ester oils.

In a further approach, the invention aims also to reduce the ecological concerns of the second problem area, i.e. that associated with the additives and auxiliary agents in drilling fluids, by selecting from the wide range of additives known in this field, at least to a large extent and preferably in all cases, those auxiliary agents which are distinguished by their ecologically harmless nature.

The subject of the invention is accordingly in a first embodiment the use of water-emulsifiable esters which are fluid and/or at least plastically deformable at working temperature and have flash points of at least 80° C., from saturated and/or unsaturated carboxylic acids with up to 36 carbon atoms and mono- and/or polyhydric alcohols as at least the predominant constituent of the dispersed oil-phase of water-based O/W-emulsion drilling fluids, which are suitable for an environmentally friendly development of geological formations, and, if desired, contain insoluble, finely particulate weighting agents for the formation of water-based O/W-emulsion drilling muds and/or further additives, such as emulsifiers, fluid-loss additives, wetting agents, alkali reserves and/or auxiliary substances for the inhibition of drilled rock with high water-sensitivity.

In a further embodiment, the invention relates to water-based O/W-emulsion drilling fluids, which in a continuous aqueous phase contain, in stable dispersion, an oil phase in amounts of about 5 to 50% by weight—the percentage by weight referred to the sum of the unweighted water phase and oil phase—together, if required, with dissolved and/or dispersed auxiliary substances of the type mentioned and are characterized in that at least the largest part of the dispersed oil phase is formed by water-emulsifiable ester oils which are fluid or at least plastically deformable at working temperature, and have flash points of at least 80° C., from saturated and/or unsaturated carboxylic acids with up to 36 carbon atoms and mono- and/or polyfunctional alcohols.

Both embodiments of the teaching according to the invention include the additional preferred step of also using for the water-based emulsion drilling fluids or emulsion drilling muds, at least to a large extent, those inorganic and/or organic auxiliary and loading substances which are at least predominantly ecologically and toxicologically harmless. And thus, for example, in the most important embodiments of the invention the use of auxiliary agents based on soluble, toxic heavy-metal compounds is avoided.

THE PREFERRED EMBODIMENTS OF THE INVENTION

The mixture ratios of the ester oil/water phases cover the usual range for the previously known O/W-emulsion drilling fluids based on mineral oils. The lower limit values for the oil phase are usually at least about 5% by weight, or preferably between about 5 and 10% by weight, e.g., therefore 7 or 8% by weight—each percentage by weight referred to the total weight of the fluid phases ester oil+water, each in the unweighted state. Minimum amounts of the order given ensure that use can be made of the characteristic peculiarities of an O/W-emulsion fluid. The upper limit value for the oil content is usually about 50% by weight or even slightly higher, e.g., a maximum of about 65% by weight. Assuming that the droplet size of the dispersed oil phase is sufficiently even, the range with the most dense packing is therefore already achieved, and thus conversion into the fluid type of the W/O-invert fluids is obvious or appears logical.

The upper limit for the ester-oil content in the O/W-fluids according to the invention is generally determined by cost/benefit considerations and is, for example, about 45% by weight, preferably less, e.g., about 40% by weight.

An ester-oil amount from about 10 to 40% by weight—percentage by weight calculated as before—and in particular amounts of the ester oil from about 15 to 35% by weight facilitate the exploitation of many—known and not previously described—advantages of such emulsion fluids. Oil contents of, for example, 20% by weight, or in an extreme case, 30% by weight provide the basis of high-quality drilling fluids which approach, at least very closely, the oil-based invert fluids in the way they function, but require very much less ester-oil phase.

THE DEFINITION OF THE ESTER OILS USED ACCORDING TO THE INVENTION

The following general considerations apply initially for the selection and adaptation of the ester oils for each application:

The ester oils should be fluid at ambient temperature, but also under their conditions of use, with the range of materials thought to be fluid, however, also including materials which are at least plastically deformable at ambient temperature and which soften to become fluid at the usually high working temperatures. For reasons of easier processability, ester oils with solidification values (pour point and setting point) below 10° C. and usefully below 0° C. are preferred in practice. Corresponding ester oils with solidification values not above −5° C. can be particularly suitable. One should take into account here the fact that the drilling fluids are usually produced on site using, for example, sea water at comparatively low water-temperatures.

For reasons of industrial safety, it must be a requirement that the ester oils have flash points of at least 80° C., however, higher flash points of at least 100° C. and substantially higher values are preferred, for example, those above 150° or 160° C.

A further important requirement for the optimal employment of the subject of the invention is that the ester oils have a biologically or ecologically acceptable constitution, i.e. in particular are free from undesired toxic constituents. In the preferred embodiment of the invention, ester oils are accordingly used which are free from aromatic constituents and in particular have saturated and/or olefin-unsaturated, straight-chain and/or branched hydrocarbon chains. The use of components containing cycloaliphatic structural constituents is possible from ecological points of view, but for reasons of cost will be of less significance in practice.

Carboxylic acid esters of the type in question here are subject to a limited degree, as the highly dispersed oil-phase in a continuous aqueous phase, to hydrolytic ester-cleavage with liberation of the ester-forming constituents carboxylic acid and alcohol. Two closely linked issues should be taken into account as regards the application properties of the ester oils in the sense of the invention, namely considerations of the possible toxicity of the liberated components, in particular of the alcohol components, when inhaled and also the change in the composition of the emulsion fluid and any associated change which may take place in its application properties.

For comprehension of the teaching according to the invention, these considerations should be examined separately for each of the ester-forming basic constituents—on the one hand the alcohols and on the other the carboxylic acids.

According to the invention, both monohydric alcohols and polyhydric alcohols are suitable as the ester-forming alcohol components, and any mixtures of these types can also be used. A further distinction can be made between alcohols according to their solubility behavior in water. The alcohols can be water-soluble and/or water-insoluble.

In a first group, polyhydric alcohols are to be considered. Particularly preferred here are the industrially easily available lower, polyfunctional alcohols with 2 to 5, preferably 2 to 4 hydroxyl groups and in particular 2 to 6 carbon atoms, which form esters with a suitable rheology.

Characteristic representatives are ethylene glycol, the propanediols and particularly glycerin.

Polyhydric alcohols of the type referred to here are distinguished by high water-solubility and at the same time by such low volatilization values that considerations of the exclusion of toxic hazards when inhaled do not usually apply.

Polyhydric lower alcohols of the type referred to here can be used as totally esterified oil components and/or as partial esters with some free hydroxyl groups and/or can be formed in the practical use of the emulsion fluid according to the invention. Provided that the partial esters formed retain the at least largely water-insoluble character of the oil phase, no substantial change takes place as regards the oil/water ratio in the emulsion fluid. The situation is only different when water-soluble hydrolysis products form—in particular therefore the free lower polyhydric alcohols. The changes which occur in practical operation in such emulsion fluids as a result of this process are, however, insignificant. Firstly, a comparatively high stability of the ester bond is ensured under the working conditions according to the invention. O/W-emulsion fluids are known to operate usually in the pH-range of approx. neutral to moderately alkaline, for example, in the pH-range of about 7.2 to 11 and in particular about 7.5 to 10.5, and thus for these reasons alone there is no aggressive hydrolytic attack on the ester bond. In addition, and moreover, the following is in particular also true:

In the practical use of the drilling fluid, and the associated driving forward of the bore into ever deeper earth strata, there is a continual consumption of the drilling fluid and in particular of the oil-phase used in the drilling fluid. Emulsion fluids are known—and this is an important point of value in their use—for the fact that the emulsified oil phase clings on to solid surfaces and therefore both seals the filter bed to the wall of the bore shaft and hinders, or even prevents, interaction between the drilled rock and the aqueous phase of the drilling fluid. This continual consumption of drilling fluid, and in particular of the oil-phase necessitates a continual supply of oil-based mud. In practical operation, a state of equilibrium is therefore rapidly established in the drilling fluid which prevails for long periods of time facilitates a continuous operation.

From some viewpoints, further considerations should be taken into account when monohydric alcohols are used in the ester oils. Here only the lower representatives of these alcohols are water-soluble or, in an unlimited quantity, water-miscible. In addition, however, volatility is a not unimportant consideration in the case of these alcohols. In the practical operation of a bore, at least moderately increased temperatures are rapidly established in the circulated drilling fluid and therefore the parts exposed by the pumping to remove the drill cuttings have a temperature, for example, in the range of 50° to 70° C. Considerations of toxicological effects when inhaled must therefore be taken into account here. Even $C_4$-alcohols, e.g., isobutyl alcohol, can be so volatile under the operating conditions on the drilling platform that hazards to personnel must be taken into account. According to the invention, therefore, when ester oils are employed together with monohydric alcohols, the lower carbon number limit for these monohydric alcohols is preferably selected as 6, and working with esters of monofunctional alcohols with at least 8 carbon atoms can be particularly preferred.

The selection and limitation of the carbon number in the ester-forming alcohol, however, at the same time has the following result as regards the composition of the ester-oil phase when there is a partial hydrolysis during operation: The hydrolyzing parts of such ester oils are converted to the free alcohol which remains as a practically water-insoluble mixture constituent in the dispersed ester-oil phase. This can bring about quite specific advantages for the functionability of the dispersed oil phase. Oil-based invert drilling-mud systems based on flowable, in particular monofunctional, alcohols with high ecological acceptability are disclosed in the Applicant's earlier Application P 39 11 238.1 (D 8511). The use of these alcohols as a material for O/W-emulsion fluids of the type comparable to that in the present invention is the subject of a parallel Application by the Applicant. To this extent the teaching of the invention is connected with that of the Parallel Application and therefore this need not be dealt with in any further detail here.

Essentially, however, the above consideration also applies here, i.e. that in practical use a quasi-static state adjusts rapidly through equilibrium formation in the composition of the ester-oil phase which is characterized by large contents of non-hydrolyzed ester oil.

A number of points must also be considered with regard to the carboxylic acids formed by the partial hydrolysis of the ester oil fluid.

Here it is possible, depending on the specific constitution of the carboxylic acids used, to distinguish between two basic types—without there being a rigid transition between the two: carboxylic acids which give rise to carboxylic acid salts with an emulsifier effect, and those which give rise to inert salts.

The respective chain-length of the liberated carboxylic acid molecule is in particular decisive here. Moreover, the salt-forming cation usually present in the alkali reserves of the drilling fluid should also be considered.

In general the following rules apply: Lower carboxylic acids, for example those with 1 to 5 carbon atoms, give rise to the formation of inert salts, for example, the formation of corresponding acetates or propionates. Fatty acids of higher chain-length and in particular those with from 12 to 24 carbon atoms result in compounds with an emulsifier effect.

By the selection of suitable ester oils—and to a certain extent also the salt-forming cations in the emulsion fluid—the specific control of the secondary products in the emulsion fluid is therefore possible, which can also have considerable influence on the nature and effect of the emulsion fluid. The above also applies here: It is not only the dispersed organic phase, but also the aqueous phase, which is subject to continual consumption in practice and thus requires replacement. In stationary operation, therefore, rapidly controllable states of equilibrium will be established, even with regard to the reaction by-products based on the ester-forming carboxylic acids as discussed here.

GENERAL DETAILS OF THE DEFINITION OF SUITABLE ESTER OILS

In the sense of the invention, the corresponding reaction products of monocarboxylic acids with monofunctional and/or polyfunctional alcohols of the type given are preferred as the ester oils. The additional use of polyvalent carboxylic acids is not, however, excluded, but they are of less significance, in particular for reasons of cost.

The carboxylic acids here can be of natural and/or synthetic origin, they are, as already indicated, preferably straight-chain and/or branched and optionally cyclic, but not aromatic in structure. The ester-forming carboxylic acids can be saturated and/or unsaturated, with unsaturated compounds here being understood, in particular, to be olefin-unsaturated compounds, which can be mono- but also poly-olefin-unsaturated. Olefin-unsaturated components can be of particular significance for adjusting the predetermined rheology values.

It is known that olefinic longer-chain compounds are suitable as corresponding saturated components for the formation of esters with lower melting points.

The preferred range for the carbon number of the carboxylic acids extends from 1 to 36 and in particular from 2 to 36. For reasons of easy availability, an upper limit for the carbon number can be about 22 to 24. The respective chain length of the ester-forming carboxylic acid components is selected—depending on the nature of the alcohols component(s) used—by consideration of the various issues already discussed, and refers not only, for example, to the ester and/or its rheology directly, but also to the reaction by-products formed in particular by partial hydrolysis.

Suitable alcohols are, as indicated, both monofunctional alcohols—provided the above limitations are taken into consideration—and polyfunctional alcohols, particularly lower polyfunctional alcohols with 2 to 6 carbon atoms and preferably with a maximum of 4 hydroxyl groups.

The alcohol components here can also be of natural and/or synthetic origin, they are straight-chain or branched and in particular in the case of the monofunctional alcohols are saturated and/or also olefin-unsaturated. Monofunctional alcohols have in particular up to 36 carbon atoms, preferably up to about 24 carbon atoms. Alcohols with 6 to 18, in particular 7 to 15 carbon atoms, of natural and/or synthetic origin can only be of particular significance in the formation of the ester oils.

Particularly important ester oils in the sense of the use in the invention are the ecologically-acceptable ester oils as described in particular in the cited earlier Applications P 38 42 659.5, P 38 42 703.6, P 39 07 391.2 and P 39 07 392.0 (U.S. Ser. No. 07/452,457 filed Dec. 18, 1989, U.S. Ser. No. 07/452,988 filed Dec. 19, 1989 both abandoned, D 8606 and D 8607). To complete the invention disclosure, the essential characteristics of these ester oils or ester mixtures are briefly summarized below.

The dispersed ester-oil phase accordingly contains carboxylic acid esters from at least one of the following sub-classes:
a) Esters from $C_{1-5}$-monocarboxylic acids and mono- and/or polyfunctional alcohols, in which radicals from monohydric alcohols have at least 6, preferably at least 8 carbon atoms, and the polyhydric alcohols preferably have 2 to 6 carbon atoms in the molecule,
b) esters from monocarboxylic acids of synthetic and/or natural origin with 6 to 16 carbon atoms, in particular esters of corresponding aliphatic-saturated monocarboxylic acids and mono-and/or polyfunctional alcohols of the type indicated under a),
c) esters of olefin mono- and/or poly-unsaturated monocarboxylic acids with at least 16, in particular 16 to 24 carbon atoms, and in particular monofunctional straight-chain and/or branched alcohols.

The latter esters of olefinic mono- and/or poly-unsaturated monocarboxylic acids with at least 16 carbon atoms (c) are preferably assigned to at least one of the following sub-classes:
c1) esters which are derived by more than 45% by weight, preferably by more than 55% by weight from di- and/or poly-olefin-unsaturated $C_{16-24}$-monocarboxylic acids,
c2) esters which are derived by not more than 35% from di- and poly-olefin-unsaturated acids, and are preferably at least about 60% by weight mono-olefin-unsaturated.

The raw materials for obtaining many of the monocarboxylic acids in these sub-classes, in particular those with a higher carbon number, are vegetable and/or animal oils. Coconut oil, palm kernel oil and/or babassu oil, can be mentioned in particular as materials used for obtaining monocarboxylic acids mainly in the range of up to 18 carbon atoms, and with essentially saturated components. Examples of vegetable ester oils, in particular for olefinic mono- and optionally poly-unsaturated carboxylic acids with from 16 to 24 carbon atoms, are palm oil, peanut oil, castor oil and in particular rapeseed oil. Carboxylic acids of animal origin of this type are in particular corresponding mixtures of fish oils, such as herring oil.

The teaching of the invention expressly includes also and in particular the use of monocarboxylic acid triglycerides and therefore in particular also the use of corresponding glyceride oils of natural origin. Here, however, the following must be considered: Natural oils and fats usually occur in a form so highly contaminated, for example, with free carboxylic acids or other accompanying substances, that there is as a rule no question of immediately processing them in O/W-emulsion fluids of the type referred to here. If such natural materials are added in the commercially available form to water-based drilling fluids, then almost immediately, such a large amount of foam forms in the drilling fluid being used as to constitute a serious hindrance or even to result in the drilling fluid being unusable. This may not be the case if cleaned and/or synthetically produced selected triglycerides are used in the dispersed oil phase. The teaching according to the invention can be realized without exception with these. In principle, however, with such esters of high-grade alcohols one must always anticipate a not inconsiderable tendency towards foam formation. Partial esters of glycerin—the mono- or di-glycerides—are known to be effective emulsifier components.

As already indicated, it is not only the comparatively low viscosity ester oils as in the disclosure of the cited earlier Applications of the Applicant in the field of invert drilling fluids which are based on ester-oils, which are suitable for the purposes of the invention, but within the framework of O/W-emulsion fluids, in particular comparatively viscous ester oils can be of advantage as the dispersed phase. They are, for example, valuable auxiliary agents for sealing the finest pores in the filter cake of the bore shaft, or in rendering inert swellable rock. The lubricating ability of such ester oils of comparatively high viscosity even at elevated temperatures in the bore shaft, and in particular also in deviated bore-holes, is in some cases distinctly better than that of the comparatively low viscosity ester oils. A dispersed ester oil phase of comparatively high-viscosity ester oils does not cause any detrimental effect on the drill-technology, the rheology of the system as a whole is determined by the continuous aqueous phase. In this sense it may be preferred to use ester oils as the dispersed phase which have a Brookfield viscosity of up to about 500,000 mPa.s or even higher, for example, up to about 1 million mPa.s or even 2 million mPa.s (determined at room temperature). This constitutes an important extension of the teaching in the named earlier Applications of the Applicant in the field of oil-based invert drilling fluids based on ester-oils.

In one embodiment of the invention, branched-chain components and in particular alpha-branched-chain alcohols and/or carboxylic acids can be of particular significance. Branches of this type are known on the one hand to influence the rheology, the esters formed by such chain-branching are usually more mobile. Moreover, such alpha-branching can, however, also promote increased hydrolysis stability under working conditions, this is therefore exploited in the invention.

THE AQUEOUS PHASE

All types of water are suitable for the production of the O/W-emulsion fluids according to the invention. These can therefore be based on fresh water and in particular also on salt water—particularly sea water for use in off-shore wells.

ADDITIVES IN THE EMULSION FLUID

In principle, all the additives used in comparable drilling fluid types can be considered, which are usually added in connection with a quite specific desired range of drilling fluid properties. The additives can be water-soluble, oil-soluble and/or water- or oil-dispersible.

Classical additives for water-based O/W-emulsion fluids can be: emulsifiers, fluid-loss additives, structure-viscosity-building soluble and/or insoluble substances, alkali reserves, agents for the inhibition of undesired water-exchange between drilled formations- e.g. water-swellable clays and/or salt strata- and the water-based drilling fluid, wetting agents for better adhesion of the emulsified oil phase to solid surfaces, e.g. for improving the lubricating effect, but also for the improvement of the oleophilic seal of exposed rock formations, or rock surfaces, disinfectants, e.g. for inhibiting bacterial attack on such O/W-emulsions, and the like. For details, reference should be made here to the relevant prior art, as described in detail in the specialist literature cited above, refer here in particular to Gray and Darley, loc. cit., Chapter 11, "Drilling Fluid Components". We will therefore only cite extracts below:

Finely-dispersed additives for increasing the fluid density: Barium sulfate (barite) is widely used, but also calcium carbonate (calcite) or the mixed carbonate of calcium and magnesium (dolomite).

Agents for building up the structure-viscosity, which at the same time also act as fluid-loss additives: Bentonite in particular should be mentioned here which is known to be used in water-based fluids in a non-modified form and is therefore ecologically safe. For salt-water fluids other comparable clays, in particular attapulgite and sepiolite, are of considerable significance in practice.

The additional use of organic polymer compounds of natural and/or synthetic origin can also be of considerable importance in this context. The following should in particular be mentioned here: starch or chemically modified starches, cellulose derivatives, such as carboxymethylcellulose, guar gum, xanthan gum, or also purely synthetic water-soluble and/or water-dispersible polymer compounds, such as in particular the polyacrylamide compounds of high molecular weight with or without anionic or cationic modification.

Thinners for viscosity-regulation: So-called thinners can be of organic or inorganic nature; examples of organic thinners are tannins and/or quebracho extract. Further examples are lignite and lignite derivatives, particularly lignosulfonates. As indicated above, in a preferred embodiment of the invention the use of toxic components is particularly to be excluded, and in particular the corresponding salts with toxic heavy metals, such as chromium and/or copper. Polyphosphate compounds are examples of inorganic thinners.

Emulsifiers: For the teaching according to the invention, two features in particular should be considered. It has emerged that a stable dispersion of ester oils is very much more easily produced than the corresponding dispersion of pure mineral oils as used in the state of the art. This in itself is a first simplification. Furthermore, it should be considered that, when longer-chain carboxylic acid esters are used, by the partial saponification of the ester oils under the additional effect of suitable alkali reserves, effective O/W-emulsifiers are also formed which contribute to the stabilization of the system.

Additives which inhibit undesired water-exchange with, for example, clays: The additives known from the state of the art for use in water-based drilling fluids can be considered here. In particular, halides and/or carbonates of the alkali and/or alkaline-earth metals, with particular importance given to corresponding potassium salts, optionally in combination with lime. Reference is made for example to the appropriate publications in "Petroleum Engineer International", September 1987, 32–40 and "World Oil", November 1983, 93–97.

Alkali reserves: inorganic and/or organic bases adapted to the total behavior of the fluid can be considered, in particular corresponding basic salts or hydroxides of alkali and/or alkaline-earth metals and organic bases.

In the field of organic bases, a conceptual distinction must be drawn between water-soluble organic bases——for example, compounds of the diethanolamine type——and practically water-insoluble bases of marked oleophilic character as described in the Applicant's earlier Application P 39 03 785.1 U.S. Ser. No. 07/478,185 filed Feb. 9, 1990 now abandoned cited above as additives in invert drilling muds based on ester oil. The use of such oil-soluble bases in the framework of the present invention in particular falls within the new teaching. Oleophilic bases of this type, which are distinguished in particular by at least one longer hydrocarbon radical with, for example, 8 to 36 carbon atoms, are, however, not dissolved in the aqueous phase, but in the dispersed oil phase. Here these basic components are of multiple significance. On the one hand they can act immediately as alkali reserves. On the other, they give the dispersed oil droplets a certain positive state of charge and therefore result in increased interaction with the negative surface charges which can be found in particular in the hydrophilic clays which are capable of ion-exchange. According to the invention one can thus influence the hydrolytic cleavage and the oleophilic sealing of water-reactive rock strata.

The quantity of auxiliary substances and additives used in each case moves essentially within the usual boundaries and can therefore be found in the cited relevant literature.

EXAMPLES

Firstly, a 6% by weight homogenized bentonite suspension is prepared using commercially available bentonite (not hydrophobized) and tap water, and a pH value of 9.2 to 9.3 is adjusted by means of a sodium hydroxide solution.

Starting with this pre-swollen aqueous bentonite phase, the individual components of the water-based ester-oil emulsion as in the following formulation are incorporated in successive stages of the process—each under intensive intermixing:

350 g 6% by weight bentonite solution
1.5 g industrial carboxymethylcellulose low-viscosity (Relatin U 300 S9)
35 g sodium chloride
70 g ester oil (according to the definition given below)
1.7 g emulsifier (sulf. castor oil "Turkey-red oil", unless otherwise indicated)
219 g barite.

Viscosity measurements are carried out on the thus prepared O/W-emulsion fluids as follows:

Firstly, the plastic viscosity (PV), the yield point (YP) and the gel strength after 10 sec. and after 10 min. of the emulsion fluid are determined at 50° C. on the unaged material.

The emulsion fluid is then aged for 16 hours at 125° C. in an autoclave in the so-called "roller-oven" to examine the effect of temperature on the stability of the emulsion. Then the viscosity values at 50° C. are determined once again. In each of the following examples the nature of the ester oil used, details of the emulsifier, the values determined for the unaged and aged material and—if necessary—general comments are given.

EXAMPLE 1

Ester-oil used: 2-ethylhexylester of a $C_{8-14}$-fatty acid mixture (essentially saturated).
Turkey-red oil as the emulsifier.

|  | unaged material | aged material |
|---|---|---|
| plastic viscosity [mPa.s] | 8 | 14 |
| yield point [Pa] | 19.2 | 13.4 |
| gel strength [Pa] | | |
| 10 sec. | 13.4 | 9.6 |
| 10 min. | 16.3 | 23.0 |

EXAMPLE 2

The formulation in Example 1 is repeated, but without using the emulsifier (Turkey-red oil).
The viscosity values measured on the unaged and aged material are as follows:

|  | unaged material | aged material |
|---|---|---|
| plastic viscosity [mPa.s] | 11 | 10 |
| yield point [Pa] | 16.8 | 18.2 |
| gel strength [Pa] | | |
| 10 sec. | 18.2 | 16.3 |
| 10 min. | 35.9 | 24.0 |

Even in the fresh formulation a slight droplet formation can be seen on the surface, after ageing the solid substance tends to settle.

EXAMPLE 3

Ester-oil used: Oleic-acid isobutylester.
Emulsifier: Turkey-red oil.
The viscosity values measured on the unaged and the aged drilling fluid are as follows:

|  | unaged material | aged material |
|---|---|---|
| plastic viscosity [mPa.s] | 11 | 13 |
| yield point [Pa] | 18.2 | 12.9 |
| gel strength [Pa] | | |
| 10 sec. | 12.5 | 9.6 |
| 10 min. | 15.8 | 18.7 |

EXAMPLE 4

The formulation in Example 3 is repeated, but now soybean lecithin (commercial product: Drilltread") is used as the emulsifier in a quantity of 1.7 g. The viscosity values measured on the unaged and aged drilling fluid are as follows:

|  | unaged material | aged material |
|---|---|---|
| plastic viscosity [mPa.s] | 11 | 12 |
| yield point [Pa] | 12.5 | 14.9 |
| gel strength [Pa] | | |
| 10 sec. | 12.5 | 6.2 |
| 10 min. | 8.6 | 16.3 |

EXAMPLE 5

With Turkey-red oil as the emulsifier, propylene-glycol-mono-oleate is used as the ester oil. The following viscosity values are determined:

|  | unaged material | aged material |
|---|---|---|
| plastic viscosity [mPa.s] | 20 | 14 |
| yield point [Pa] | 20.1 | 16.3 |
| gel strength [Pa] | | |
| 10 sec. | 15.8 | 12.5 |
| 10 min. | 24.9 | 24.9 |

EXAMPLE 6

Again using Turkey-red oil as the emulsifier, a tri-methylolpropane tri-fatty-acid ester is used as the ester-oil phase. The values measured for the unaged and aged material are as follows:

|  | unaged material | aged material |
|---|---|---|
| plastic viscosity [mPa.s] | 15 | 16 |
| yield point [Pa] | 17.7 | 15.8 |
| gel strength [Pa] | | |
| 10 sec. | 13.9 | 12.9 |
| 10 min. | 20.6 | 23.0 |

EXAMPLE 7

In the context of the teaching of Example 6, a corresponding glycerin tri-fatty-acid ester is used as the ester oil phase. The values determined for the unaged and aged emulsion drilling fluid are as follows:

|  | unaged material | aged material |
|---|---|---|
| plastic viscosity [mPa.s] | 13 | 12 |
| yield point [Pa] | 8.6 | 8.1 |
| gel strength [Pa] | | |

|  | unaged material | aged material |
|---|---|---|
| 10 sec. | 8.6 | 6.2 |
| 10 min. | 9.1 | 5.8 |

EXAMPLE 8

Using Turkey-red oil as the emulsifier, the residue, esterified with n-hexanol, from the fatty-acid dimerization (monomer fatty acid "Aliphat 47") is incorporated as the ester-oil phase. The viscosity values determined for the unaged and aged material are as follows:

|  | unaged material | aged material |
|---|---|---|
| plastic viscosity [mPa.s] | 14 | 16 |
| yield point [Pa] | 17.2 | 14.4 |
| gel strength [Pa] |  |  |
| 10 sec. | 12.0 | 9.1 |
| 10 min. | 12.9 | 22.5 |

We claim:

1. A water-based, oil-in-water emulsion drilling fluid suitable for the development of geological formations, said drilling fluid consisting essentially of
   A. a continuous aqueous phase containing from about 5 to about 50% by weight of an oil phase dispersed in said aqueous phase, based on the weight of said oil phase and said aqueous phase, said oil phase comprising a water-emulsifiable ester oil which has a flash point of at least about 80° C., said ester oil being selected from the group consisting of an ester oil having been obtained from a $C_1$–$C_5$ monocarboxylic acid and a polyfunctional alcohol, and a $C_1$–$C_{36}$ monocarboxylic acid and a monofunctional alcohol having at least 6 carbon atoms,
   B. an emulsifier,
   C. a fluid-loss additive,
   D. a weighting agent,
   E. a viscosifier, and
   F. an alkali reserve component.

2. A water-based, oil-in-water emulsion drilling fluid as in claim 1 wherein said oil phase is present in an amount of from about 8 to about 40% by weight.

3. A water-based, oil-in-water emulsion drilling fluid as in claim 1 wherein said polyfunctional alcohol contains from 2 to 6 carbon atoms and up to 4 hydroxyl groups.

4. A water-based, oil-in-water emulsion drilling fluid as in claim 3 wherein said polyfunctional alcohol is selected from ethylene glycol, propanediol and glycerol.

5. A water-based, oil-in-water emulsion drilling fluid as in claim 1 wherein said ester oil has a pour point and setting point of below about 0° C. and a flash point of at least about 100° C.

6. A water-based, oil-in-water emulsion drilling fluid as in claim 1 wherein said ester oil has a Brookfield (RVT) viscosity of less than about 1 million mPas at about 20° C.

7. A water-based, oil-in-water emulsion drilling fluid as in claim 1 having a pH of from about 7.2 to about 11.

8. A water-based, oil-in-water emulsion drilling fluid as in claim 1 wherein said ester oil is selected from the group consisting of (a) an ester of a $C_1$–$C_5$ monocarboxylic acid and a mono-or polyfunctional alcohol wherein said monofunctional alcohol contains at least 6 carbon atoms and said polyfunctional alcohol contains from 2 to 6 carbon atoms,
   (b) an ester of a $C_6$–$C_{16}$ aliphatically-saturated monocarboxylic acid and a monofunctional alcohol containing at least 6 carbon atoms, and
   (c) an ester of a $C_{16}$–$C_{24}$ mono-or polyolefinically unsaturated monocarboxylic acid and a monofunctional straight-chain or branched alcohol containing at least 6 carbon atoms.

9. A water-based, oil-in-water emulsion drilling fluid as in claim 8 wherein said component (c) is selected from (C1) an ester containing at least about 45% by weight of a di-or polyolefinically unsaturated $C_{16}$–$C_{24}$ monocarboxylic acid, and (C2) an ester containing less than about 35% by weight of a di-or polyolefinically unsaturated $C_{16}$–$C_{24}$ monocarboxylic acid and at least about 60% by weight of mono-olefinically unsaturated $C_{16}$–$C_{24}$ monocarboxylic acid.

10. A water-based, oil-in-water emulsion drilling fluid as in claim 1 containing up to about 10% by weight, based on the weight of said oil phase, of an oleophilic basic amine having limited solubility in water, said amine being free from aromatic constituents and having at least one long-chain hydrocarbon radical containing 8 to 36 carbon atoms.

11. A water-based, oil-in-water emulsion drilling fluid as in claim 1 wherein said continuous aqueous phase is selected from fresh water and water containing dissolved or suspended salts.

12. A water-based, oil-in-water emulsion drilling fluid as in claim 1 wherein said ester oil is formed from at least one branched-chain component.

13. The process of developing a source of petroleum, natural gas or water by drilling, comprising drilling said source in the presence of a drilling fluid comprising a water-based, oil-in-water emulsion drilling fluid suitable for the development of geological formations, said drilling fluid consisting essentially of
   A. a continuous aqueous phase containing from about 5 to about 50% by weight of an oil phase dispersed in said aqueous phase, based on the weight of said oil phase and said aqueous phase, said oil phase comprising a water-emulsifiable ester oil which has a flash point of at least about 80° C., said ester oil being selected from the group consisting of an ester oil having been obtained from a $C_1$–$C_5$ monocarboxylic acid and a polyfunctional alcohol, and a $C_1$–$C_{36}$ monocarboxylic acid and a monofunctional alcohol having at least 6 carbon atoms,
   B. an emulsifier,
   C. a fluid-loss additive,
   D. a weighting agent,
   E. a viscosifier, and
   F. an alkali reserve component.

14. The process as in claim 13 wherein said oil phase is present in an amount of from about 8 to about 40% by weight.

15. The process as in claim 13 wherein said polyfunctional alcohol contains from 2 to 6 carbon atoms and up to 4 hydroxyl groups.

16. The process as in claim 15 wherein said polyfunctional alcohol is selected from ethylene glycol, propanediol and glycerol.

17. The process as in claim 13 wherein said ester oil has a pour point and setting point of below about 0° C. and a flash point of at least about 100° C.

18. The process as in claim 13 wherein said ester oil has a Brookfield (RVT) viscosity of less than about 1 million mPas at about 20° C.

19. The process as in claim 13 wherein said drilling fluid has a pH of from about 7.2 to about 11.

20. The process as in claim 13 wherein said ester oil is selected from the group consisting of
   (a) an ester of a $C_1$-$C_5$ monocarboxylic acid and a mono-or polyfunctional alcohol wherein said monofunctional alcohol contains at least 6 carbon atoms and said polyfunctional alcohol contains from 2 to 6 carbon atoms,
   (b) an ester of a $C_6$-$C_{16}$ aliphatically-saturated monocarboxylic acid and a monofunctional alcohol containing at least 6 carbon atoms, and
   (c) an ester of a $C_{16}$-$C_{24}$ mono-or polyolefinically unsaturated monocarboxylic acid and a monofunctional straight-chain or branched alcohol containing at least 6 carbon atoms.

21. The process as in claim 20 wherein said component (c) is selected from (C1) an ester containing at least about 45% by weight of a di-or polyoleofinically unsaturated $C_{16}$-$C_{24}$ monocarboxylic acid, and (C2) an ester containing less than about 35% by weight or a di-or polyolefinically unsaturated $C_{16}$-$C_{24}$ monocarboxylic acid and at least about 60% by weight of mono-olefinically unsaturated $C_{16}$-$C_{24}$ monocarboxylic acid.

22. The process as in claim 13 wherein said drilling fluid contains up to about 10% by weight, based on the weight of said oil phase, of an oleophilic basic amine having limited solubility in water, said amine being free from aromatic constituents and having at least one long-chain hydrocarbon radical containing 8 to 36 carbon atoms.

23. The process as in claim 13 wherein said continuous aqueous phase is selected from fresh water and water containing dissolved or suspended salts.

24. The process as in claim 13 wherein said ester oil is formed from at least one branched-chain component.

* * * * *

Disclaimer 5,318,956—Heinz Mueller, Monheim; Claus-Peter Herold, Mettmann; Stephan von Tapavicza, Erkrath; Johann Friedrich Fues, Grevenbroich, all of Fed. Rep. of Germany. USE OF SELECTED ESTER OILS IN WATER-BASED DRILLING FLUIDS OF THE O/W EMULSION TYPE AND CORRESPONDING DRILLING FLUIDS WITH IMPROVED ECOLOGICAL ACCEPTABILITY. Patent dated June 7, 1994. Disclaimer filed July 17, 1997, by the assignee, Baroid Limited.

The term of this patent shall not extend beyond the expiration date of Patent No. 5,194,422.
*(Official Gazette,* November 4, 1997)

UNITED STATES PATENT AND TRADEMARK OFFICE
Certificate

Patent No. 5,318,956            Patented: June 7, 1994

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Heinz Mueller, Monheim, Germany; Claus-Peter Herold, Mettmann, Germany; Stephan von Tapavicza, Erkrath, Germany; Johann Friedrich Fues, Grevenbroich, Germany; and Douglas J. Grimes, Stonehaven, Scotland.

Signed and Sealed this Twenty-fourth Day of June 2003.

JAMES O. WILSON
*Supervisory Patent Examiner*
Art Unit 1623